US005200007A

United States Patent [19]

Svyatsky

[11] Patent Number: 5,200,007

[45] Date of Patent: Apr. 6, 1993

[54] DOCUMENT FORWARDING SYSTEM

[75] Inventor: Eduard Svyatsky, Chicago, Ill.

[73] Assignee: Bell & Howell Company, Skokie, Ill.

[21] Appl. No.: 791,040

[22] Filed: Nov. 12, 1991

Related U.S. Application Data

[60] Division of Ser. No. 635,938, Dec. 28, 1990, Pat. No. 5,076,876, which is a continuation of Ser. No. 109,467, Oct. 16, 1987, abandoned.

[51] Int. Cl.[5] .............................................. B32B 31/00

[52] U.S. Cl. ...................................... 156/64; 156/229; 156/242; 156/249; 156/361; 156/384; 156/542

[58] Field of Search ................. 156/361, 542, 363, 64, 156/229, 247, 249, 384, 540, 541

[56] References Cited

U.S. PATENT DOCUMENTS

| | | | |
|---|---|---|---|
| 3,891,492 | 6/1975 | Watson | 156/361 |
| 4,082,595 | 4/1978 | Slater | 156/361 |
| 4,104,105 | 8/1978 | Rayfield et al. | 156/364 |
| 4,188,252 | 2/1980 | Brown | 156/542 |
| 4,435,243 | 3/1984 | Azeez et al. | 156/361 |
| 4,670,081 | 6/1987 | Takahashi et al. | 156/361 |
| 4,758,303 | 7/1988 | Shastko et al. | 156/542 |

*Primary Examiner*—Caleb Weston
*Assistant Examiner*—J. Sells
*Attorney, Agent, or Firm*—Welsh & Katz, Ltd.

[57] ABSTRACT

A system for applying corrective mailing labels to documents and the like wherein a plurality of labels are releasably carried in sequential fashion on an elongated flexible substrate. The system includes a label printing station, a label applying drum, and label stripper means including a stripper blade having a free end disposed adjacent the drum and about which the substrate is guided so as to undergo a relatively abrupt reversal in direction. A substrate tractor drive downstream from the stripper blade normally pulls the substrate under tension about the free end of the stripper blade to effect release of labels from the substrate for application to predetermined envelopes, the substrate tractor drive being selectively operable to create a substrate loop path immediately downstream from the free end of the stripper blade to prevent release of an incorrect label from the substrate.

6 Claims, 6 Drawing Sheets

DOCUMENT FORWARDING SYSTEM

This is a divisional application from Ser. No. 07/635,938, filed Dec. 28, 1990, now U.S. Pat. No. 5,076,876 which is a continuation application from Ser. No. 07/109,467, filed Oct. 16, 1987, abandoned. The present invention relates generally to mail handling systems, and more particularly to a novel and improved forwarding address system for use with mail sorting machines.

BACKGROUND OF THE INVENTION

The volume of mail handled daily by large businesses, institutions and governmental entities has steadily increased through the years. For example, credit card companies, utilities, mail order houses and other advertisers send and receive huge quantities of mail daily. Typically, the envelopes containing the material to be mailed are addressed and then sorted into common groups for mailing. Similarly, mail received by such entities is commonly sorted into groups based on the subject matter of the received material. A third category of such envelopes is the returned mail category the creation of which is primarily due to the addressee having moved from a particular address resulting in the envelope being undeliverable. The present invention is directed to a system for solving the latter type problem, namely, the correction of the address on an envelope by application of a secondary label to the envelope with a correct forwarding address that will permit its proper delivery.

Several different types of machines have been developed to assist in the handling of such mail, other than manual review and correction by an individual mail carrier. These prior art devices typically comprise an envelope feeder, a read station, a label selection station where a supply of labels permits selection of an appropriate label and its application to an envelope, and a sorting and storage means. Some such machines further include means for printing individual labels for each envelope but require individual handling of the labels for application to each envelope. None of the prior art machines and systems have proved satisfactory since they are relatively large unwieldy machines that require not only a large amount of space but also require frequent replenishment of a vast array of preprinted label supplies and maintenance of the applicating equipment.

SUMMARY OF THE INVENTION

The present invention provides a novel computer-operator controlled system for applying corrective mailing labels to envelopes and the like and which utilizes a plurality of unique stations suitable for use with conventional mail sorting machines.

The system of the present invention includes a feeder module having a unique feeder apparatus wherein incoming envelopes are separated from each other and delivered to a transport module. The transport module moves the envelopes or documents to a plurality of read stations that are provided with a monitor and input keyboard means tied to a main computer data source for use and control by an operator. Observation of indicia on successive envelopes by the operator and selective input into the input keyboard means results in an electable response by the operator, the elected information being sent to a unique print module for use in creation of an appropriate corrective label. The envelopes that pass through the read station are serially moved through a unique labeler module that forms the basis for the present application and utilizes the serially produced labels emanating from the print module. The corrected envelopes are then sorted in a known sorting machine by use of the same information that controlled the creation of a label in the printer module.

The labels produced by the printer are carried on a substrate and moved to the label module which is operative to remove the labels from the substrate or backing material by abruptly reversing the direction of travel of the substrate so as to release the labels. The released labels continue to move in substantially the same direction they were moving at the time of release from the substrate which coincides with the direction of movement of envelopes, thereby enhancing the effectiveness and rapidity of applying a label to a particular chosen envelope.

Accordingly, one of the primary objects of the present invention is to provide a novel labeler module for applying preprinted self-adhesive labels to predetermined envelopes or documents for which they have been prepared by effectively and rapidly removing the labels from a backing substrate generally simultaneously with their application to the predetermined envelopes.

Another object of the present invention is to provide a system for applying corrective mailing labels to mailing envelopes wherein an operator reads successive envelopes conveyed to a read station and inputs data from each envelope into a computer data source which provides responsive data to the operator for inputting to a print module. The print module prints corrective mailing indicia on predetermined mailing labels carried on a substrate. The corrective labels are carried by the substrate to a label applying module that includes a stripper blade about which the substrate is guided in abrupt reversal of direction to effect release of successive labels for application to predetermined envelopes. A tractor drive downstream from the stripper blade cooperates with the substrate in a manner to release tension in the substrate and prevent release of a mailing label which has been determined to have improper mailing indicia imprinted thereon.

Another object of the present invention is to provide a novel labeler module for use in applying mailing labels to predetermined envelopes, the labeler module including a stripper blade cooperative with a substrate carrying the releasable labels to effect release of the labels from the substrate for application to envelopes, and a label rejector assembly cooperative with the label carrying substrate to prevent release of a label having improper mailing indicia thereon.

Still another object of the present invention is to provide an improved labeler module for use with a system of the type described that will reliably operate over extended time with minimal down time, as well as being relatively simple and economical to construct and operate.

Further objects and advantages of the present invention, together with all of the features of novelty appurtenant thereto, will become apparent in the course of the following description.

DETAILED DESCRIPTION

Figure 4A:
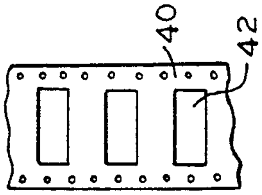
FIG. 4A is a partial plan view of a plurality of prior art labels disposed transversely on a substrate in a side-to-side fashion.

Referring now to the drawings wherein like elements are designated by like reference numerals, a computer assisted document forwarding system of the type incorporating the present invention is designated generally at 20. The document forwarding system 20 includes an integrated system of several modules, each of which is interrelated with the others and mutually interdependent when used in such system, but which under other circumstances is capable of operating independently. Such forwarding systems are utilized to reduce the labor factor involved in updating a mailing list and also to forward mail that has been erroneously deposited at a local post office because of having an erroneous mailing address thereon.

A system of the type contemplated by the present invention includes a feeder module 22, a transport module 24 having a plurality of observation means stations, a print module 26, a labeler module 28, a label cassette 30, and a sorting and stacking module 32. Such a system finds particular use by local post offices where documents, i.e. small envelopes of various sizes, have been retained because a customer has entered a change of address order such that the retained documents are not properly addressed for delivery purposes. Such a system also finds application in catalog, credit card and mail order systems and the like where changes in addresses must be accommodated. It also applies a ready update system and reduces labor expense by providing an accurate, readily available listing of correct addresses for immediate application to a document. The system works in conjunction with a master computer which contains address change data accessible by subsidiary or remote stations to enable an operator to update on a ready basis the address to which particular pieces of mail are to be forwarded.

Broadly, a plurality of documents or envelopes are stacked on a feeder module which feeds them sequentially in serial fashion, one at a time, to the first of the plurality of reader or observation stations located in the transport module 24. The operator reads the address of the document and types into the computer keyboard an abbreviated version of the address, for example, the first three letters of the addressee's last name and the last two digits of the zip code. The keyboard is the input mechanism into an electronic information storage means inter- connected with the input means and also serves as a retrieval means to request further data with which to inform the operator. Normally, where there is only one combination of such letters and digits on file, the computer automatically selects the proper address corresponding to the inputted combination of letters. If there is more than one possible response to the inputted data, all responses are provided to the operator, for example, by visually displaying the responses on a cathode ray tube (CRT) 34 or by audible or tactile means. The operator then selects the correct response and continues the operation by striking an appropriate key on the keyboard. The document is then fed to a buffer station on the transport module 24 where it remains while a label is printed in the print module 26 from the selected data fed to it by the computer. The document is then released from the buffer station and transported to the labeler module 28 of the present invention where the previously printed label with the correct address information thereon for the particular addressee is applied to the proper document. It is then moved through to the sorter and stacker, which movement can also be controlled on the basis of the same data fed from the computer to the printer so that it is immediately broadly sorted for delivery to the correct address.

Figure 1:
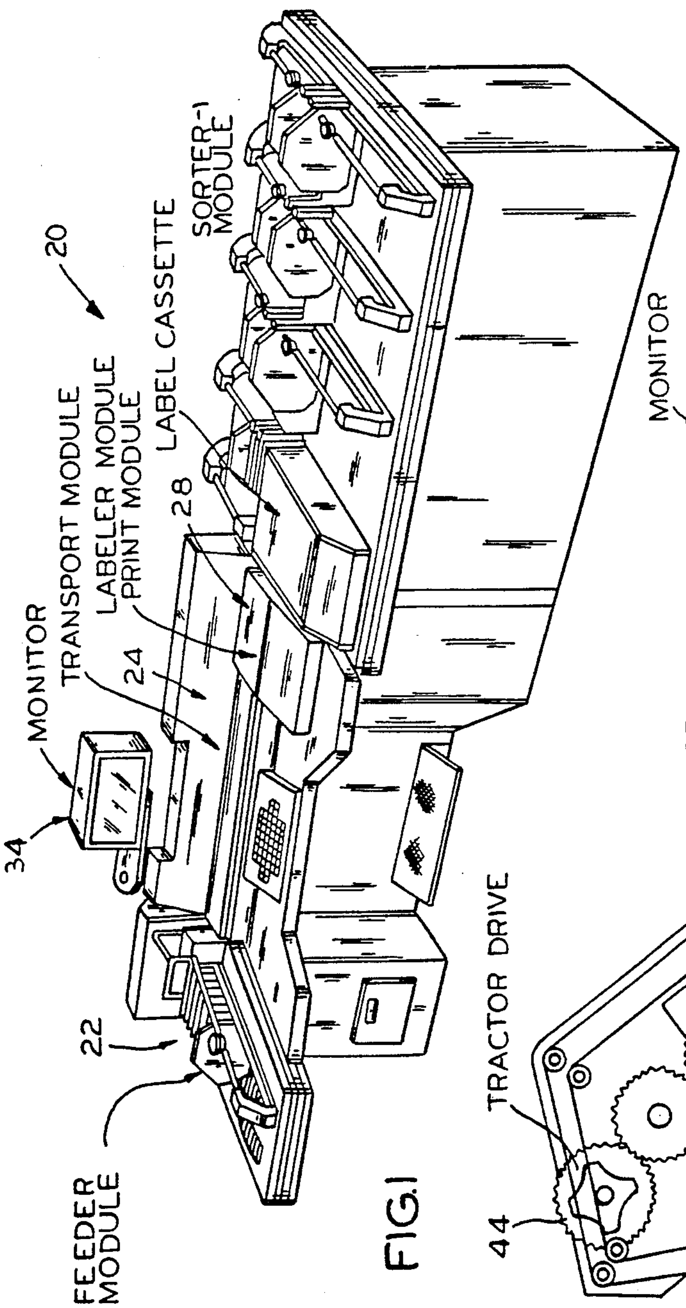
FIG. 1 is a perspective view of a system that can utilize an embodiment of the present invention.

Referring now to FIGS. 1–4A, a system of the type adapted to utilize the present invention is generally shown in perspective in FIG. 1 and, as previously described, can include a feeder module 22, a transport module 24, a print module 26, a labeler module 28, a label cassette 30 and a sorter stacker module 32.

Figure 2:
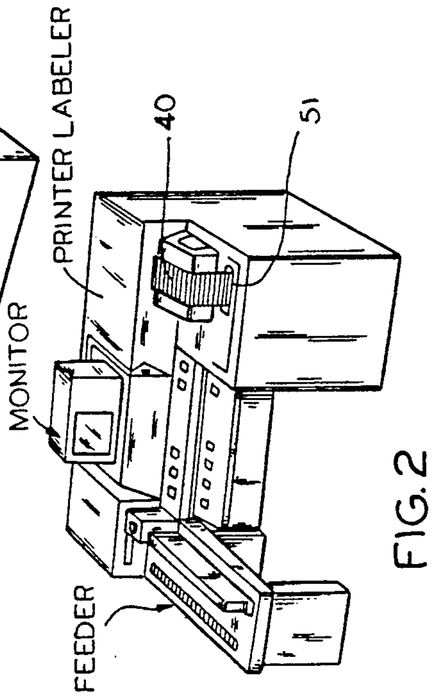
FIG. 2 is a partial perspective view of a prior art system utilizing a printer/labeler module.
Figure 3:
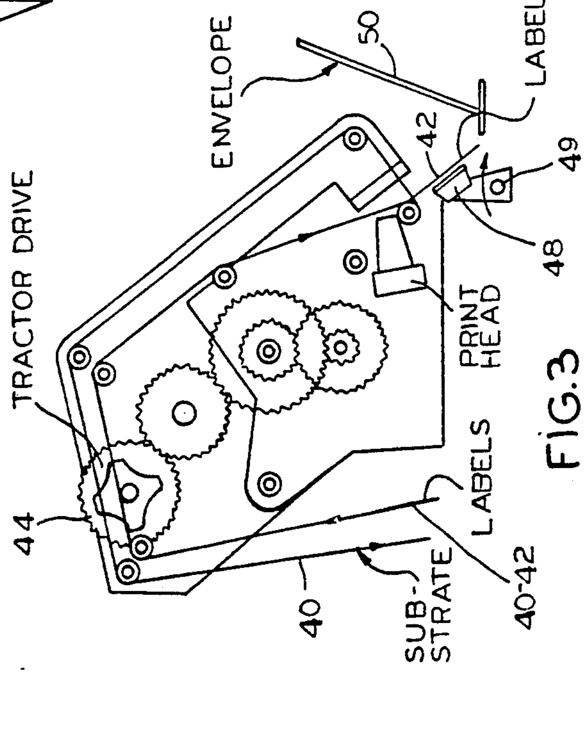
FIG. 3 is a schematic view of the interior of the prior art printer/labeler module of the type used in the system of FIG. 2.

FIGS. 2–3 illustrate a prior art printer/labeler device which utilizes the type of label as illustrated in FIG. 4A where the labels 42 have their major longitudinal axes disposed transversely of the longitudinal axis of the substrate 40 in a side-by-side sequential arrangement. As schematically illustrated in FIG. 3, the substrate 40 carrying the labels 42 is driven by a tractor drive 44 past a print head 46 with the printed label 42 being stripped off the substrate and picked up by a head 48 which rocks about pivot 49 to permit application of the label to an envelope 50. The substrate 40 then retraces its general path until it moves into a scrap container after passing through slot 51 (FIG. 2) in the cabinet supporting the labeler/printer. This disposition requires that the substrate motion be an intermittent one to permit the head 48 to pick up a printed label and apply it to the envelope 50. This requires a large degree of maintenance to ensure synchronization of the motion and timing of the several interrelated functions. Fast operation is hindered by the operator being under the constraint of the intermittent motion of the substrate due to the time factor in the rocking of the application head 48 found in the illustrated prior art labeler.

The present invention is a key factor in the operation of the improved system as broadly aforedescribed. Reviewing briefly, and again referring to FIG. 1, as the feeder module 22 sequentially presents serially disposed documents or envelopes 50 one at a time to the transport module 24, the envelopes proceed across in front of the operator to enable the operator to read the address and name of the addressee in a viewing station. While the envelope is in the viewing station, the operator types coded information, such as selected letters and digits from the addressee's name and zip code, into a computer keyboard terminal (not shown). The inputted coded information is fed into a computer having corrective information stored in its data base. After typing in the last digit of the coded information and viewing it on the monitor 34, the program in the computer causes envelope stop means to be activated and moved out of the way to permit envelopes 50 to move to the next station.

When an envelope 50 is positioned in a reviewing station and its code information has been inputted to the computer, the operator looks at the monitor 24 to determine whether there is a possibility of a multiple choice in corrective mailing data displayed on the monitor from the computer data base. If a multiple choice exists, the operator makes the necessary selection to correspond to the remainder of information that had not been fed into the computer with the abbreviated code, that is, the remaining letters and digits from the addressee's name and zip code. Selection of one of the choices will then be made and the envelope passed to a buffering station. Each envelope 50 is retained in the buffering station until the printed information for that particular envelope has been completed and the label is ready to be applied to the envelope.

Figure 4B:
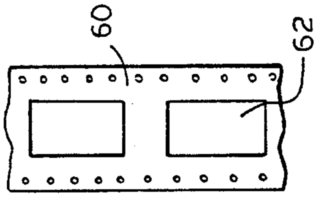
FIG. 4B is a partial plan view of the end-to-end disposition of labels on a substrate preferred by the present invention.
Figure 5:
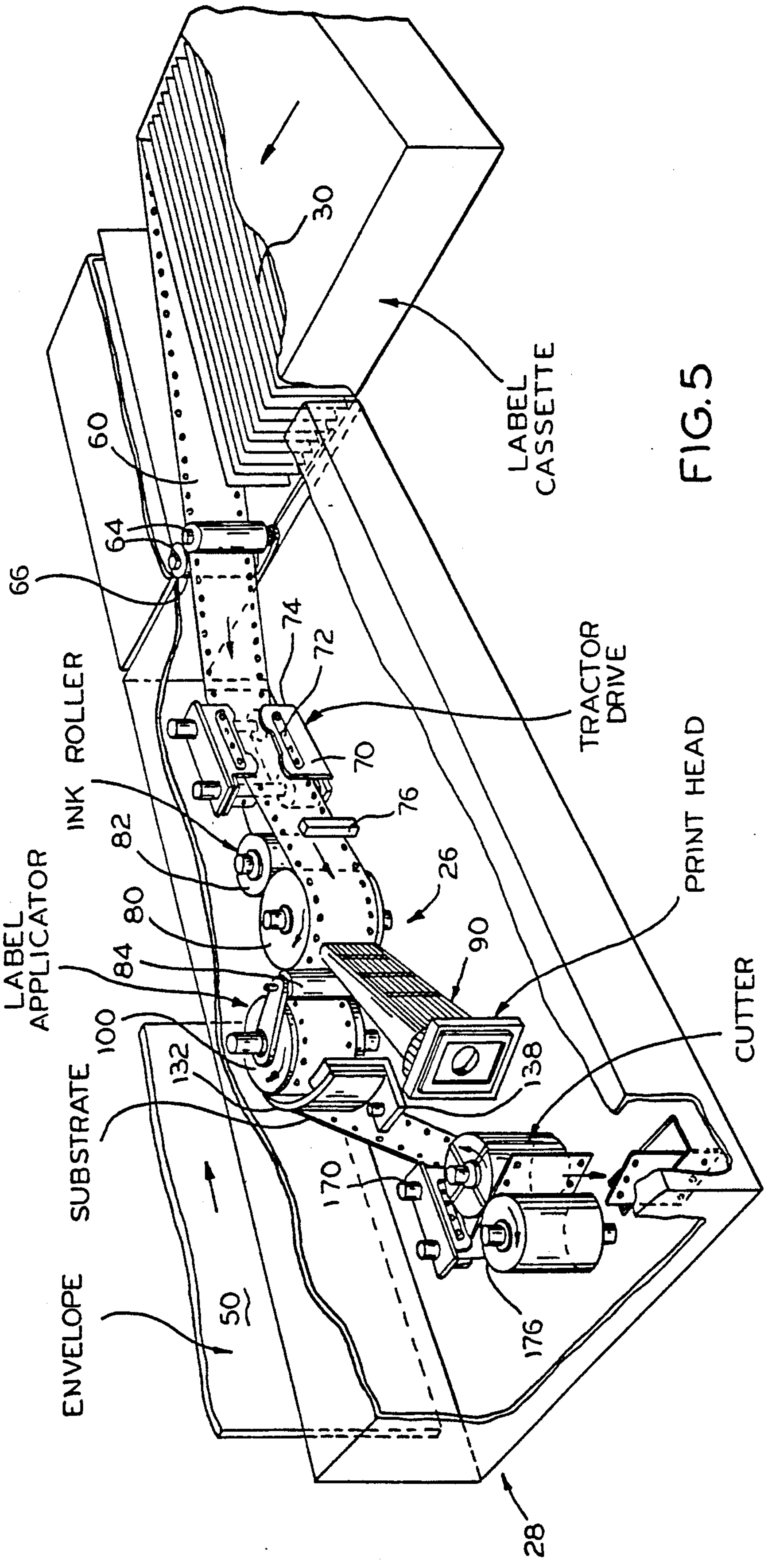
FIG. 5 is a perspective view in partial section of a printing/labeler module of the type contemplated by the present invention.
Figure 6:
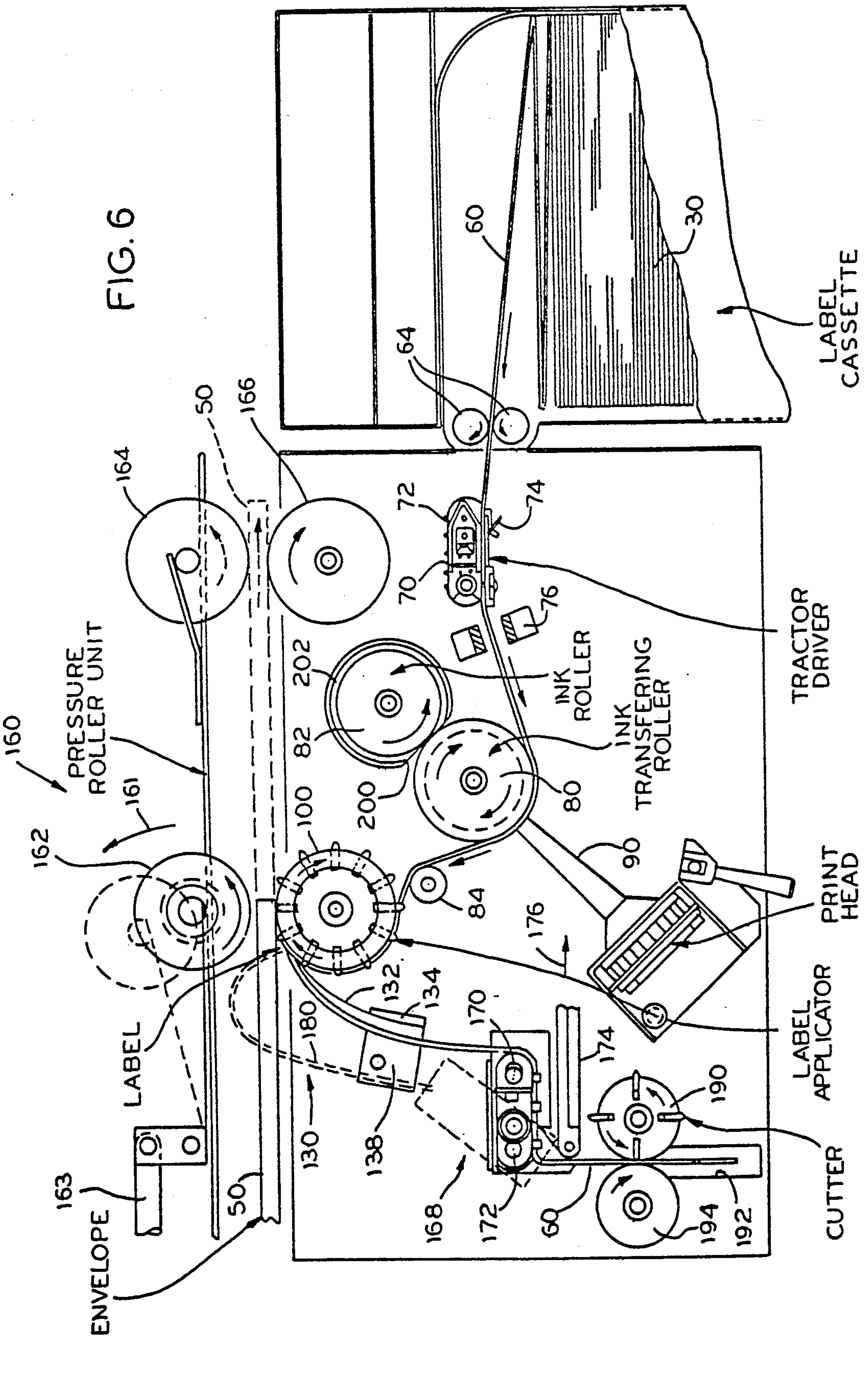
FIG. 6 is a schematic type plan view in partial section of the feeding of labels disposed in end-to-end fashion on a tractor driven substrate tape from a label cassette past the printing station to the label applying station and with the label rejector and waste cutter mean shown in plan view.
Figure 8:
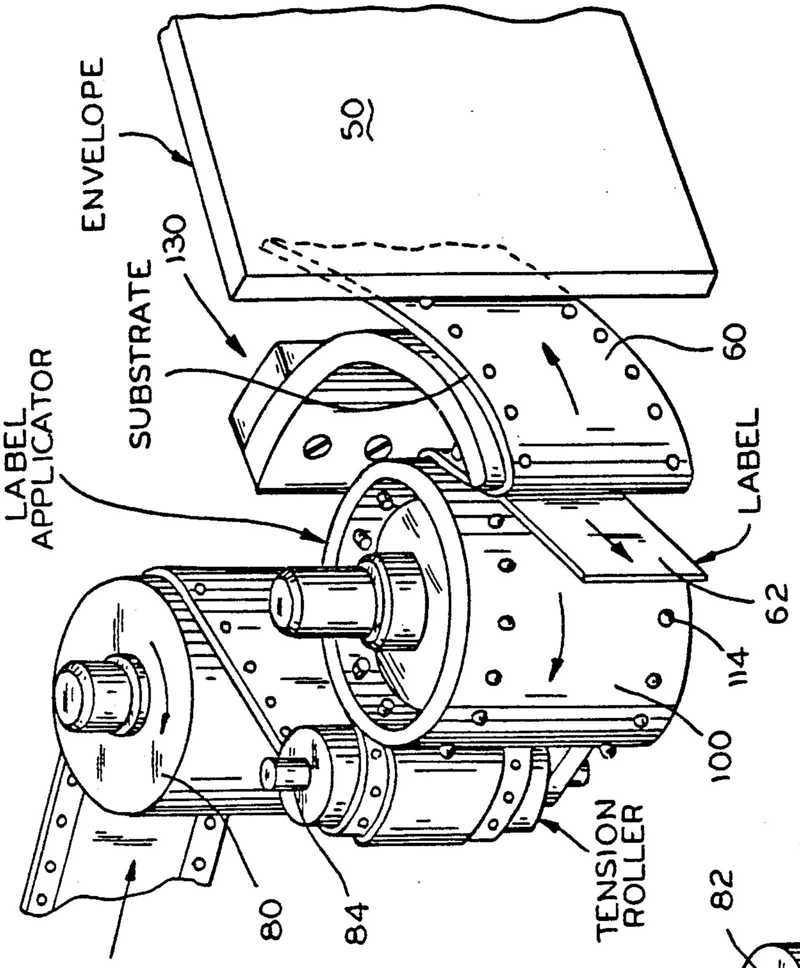
FIG. 8 is a further enlarged partial perspective view of the reverse side of the mechanism shown in FIG. 7 as seen from the perspective of the envelope.

Referring now to FIGS. 4B, 5 and 6, the preferred tractor drive labels utilized in the present invention are shown in FIG. 4B where the labels 62 are disposed in an end-to-end configuration on a substrate 60. The labels are fanned-folded and delivered for use in a readily storable cassette 30, the labels and substrate 60 being fed between rollers 64 and a detecting means (not shown) which checks the availability of labels and their absence from the cassette 30.

The labeler module 26 and the printer module 28 are physically interrelated by close proximity but, for purposes of discussion, the labeler module 26 will be discussed in detail while the printer module 28 will be discussed in general terms. A more detailed description of the printer module 28 is set forth in copending application Ser. No. 07/109,474, filed Oct. 16, 1987.

Referring now to FIGS. 5 and 6, the labeler module 26 requires a supply of labels 62 disposed on a substrate 60 in end-to-end fashion and with suitable tractor means for driving the substrate. The substrate and associated labels are such that the labels may be released from the surface of the substrate under proper conditions, each label having a pressure sensitive adhesive on its reverse side facing the substrate. In the illustrated embodiment, the label cassette 30 contains an elongated strip-like substrate 60 having a plurality of serially disposed apertures along its longitudinal marginal edges for engagement with suitable tractor drive mechanisms so as to carry the elongated labels 62 in end-to-end relation and positioned between the tractor drive apertures. The substrate 60 is disposed in the cassette 30 in an edge wise fanfold arrangement, and a pair of spring urged wheels 64 are provided to ensure smooth feeding of the strip through a side aperture 66 in the cassette.

A tractor drive 70 is disposed laterally of aperture 66 and has a plurality of power driven pins 72 maintained in positive engagement with the holes of the substrate 60 by a moveable spring-biased gate 74. A detector means 76 is disposed adjacent the tractor drive 70 for purposes to be hereinafter described.

Figure 13:
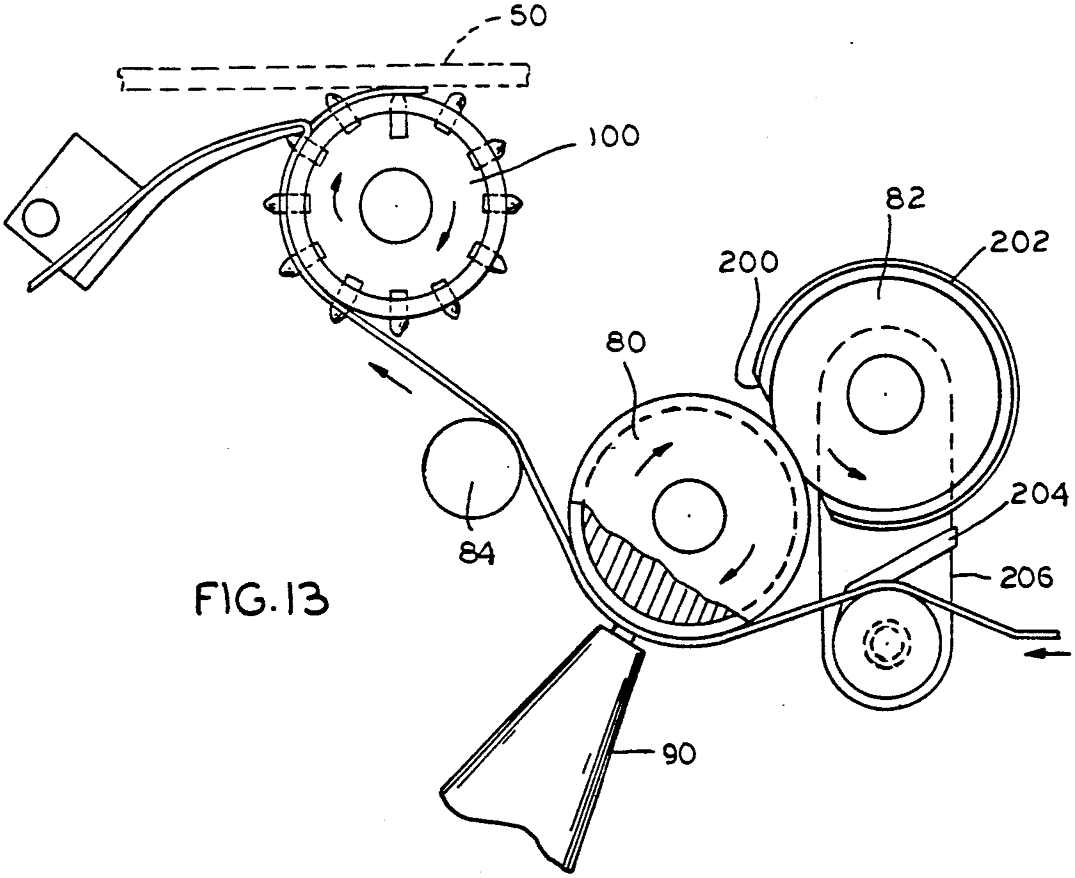
FIG. 13 is a schematic view in partial section showing the disposition of elements in the feed path of the substrate through the printing module and the labeler module, in enlarged format.

The substrate strip 60 with the labels 62 carried thereon passes over an idler roller 78 (FIGS. 7 and 13) into engagement with an ink transfer roller 80 for striking by a print head 90 to transfer ink from roller 80 to the surfaces of the labels 62 facing the roller 80. Tension in the substrate strip 60 is maintained by a spring-loaded idler roller 84. An impregnated ink roller 82 extends through an aperture 200 in a case 202 and is maintained in contact with ink transfer roller 80 by spring means 204 which acts on a pivot arm 206 on which the ink roller 82 and its case 202 are mounted. The specific details of ink transfer roller 80 and its relationship to print head 90 and ink transfer roller 82 are set forth in the aforementioned copending application Ser. No. 07/109,474, filed Oct. 16, 1987.

After passing over the idler pulley 84, the substrate strip 60 engages a label applicator drum 100. The drum 100 is illustrated in plan view in FIG. 6, in partial longitudinal cross-section in FIG. 10, and with one detail shown in FIG. 11. The applicator drum 100 includes a cylindrical roller or drum body 110 having a pair of counterbored coaxially cavities 112 at opposite ends. A plurality of headed bullet-nose pins 114 project outwardly through a like number of radial apertures communicating between the outer cylindrical surface of the roller body 110 and the inner cavities 112.

Figure 10:
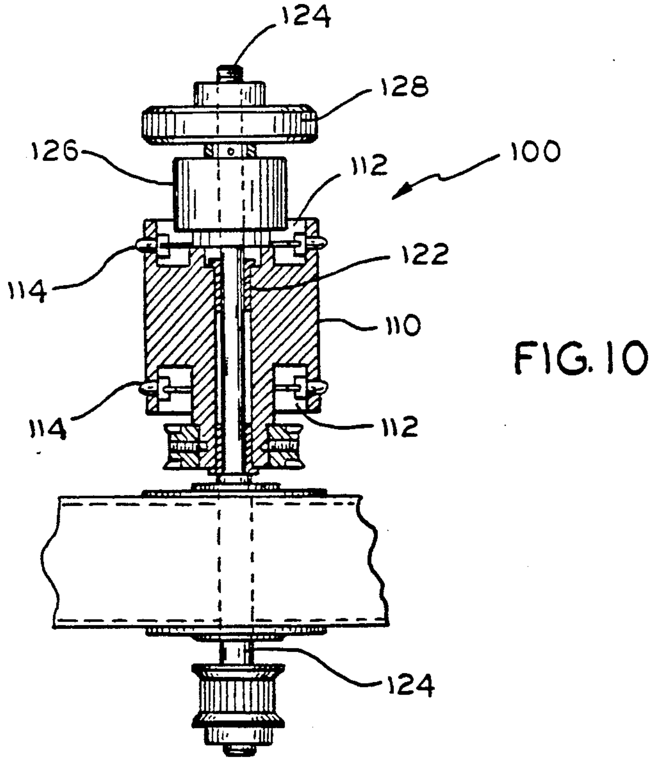
FIG. 10 is an elevational view in partial section showing details of the label applicator roller.
Figure 11:
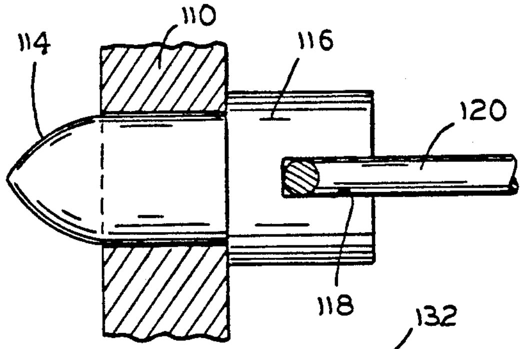
FIG. 11 is an enlarged elevational view in partial section showing the detail of one of the spring loaded fingers in the label applying drum.
Figure 12A:
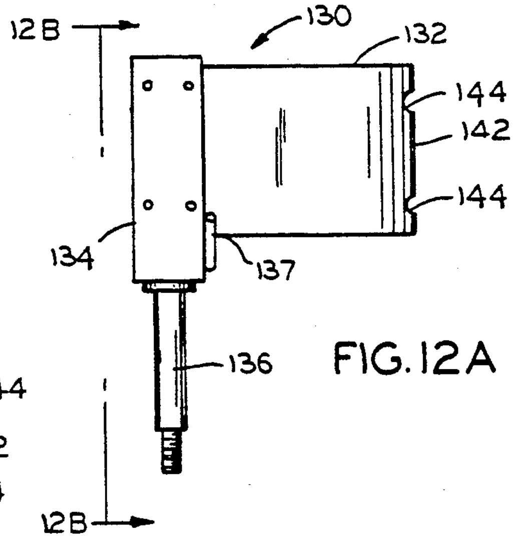
FIG. 12A is an elevational view of the direction controlling means for the separation of the label from the substrate or backing release tape.
Figure 12B:
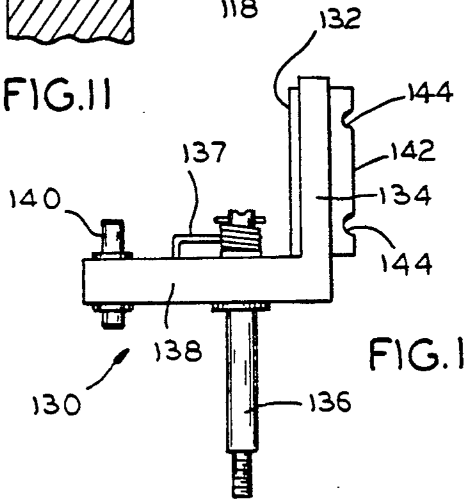
FIG. 12B is an elevational view of the direction controlling means taken along line 12B-12B in FIG. 12A.

In the embodiment of the applicator drum 100 illustrated in FIG. 11, the inner ends of the pins 14 have enlarged diameter heads 116 which are transversely slotted at 118 to accept spring means in the form of a one-piece or unitary spring steel wire ring 120 which biases the pins to their outer-most positions relative to the outer peripheral surface of the drum while enabling the pins to be depressed radially inwardly within their respective apertures. As illustrated in FIG. 10, the drum body 110 is freely rotatably mounted by bushings 122 on a synchronously driven shaft 124 and is coupled to shaft 124 through a conventional one-way or unidirectional clutch means 126 which prevents counterclockwise rotation of the drum body and can be rotatably adjusted relative to the drive shaft 124 by a hand-held roller 128. The circumferential rows of pins 114 are axially spaced to accommodate the traction holes in substrate strip 60 normally positioned on laterally opposite sides of the labels 62 carried end-to-end on the substrate, the label side of the substrate being in direct contact with the outer cylindrical surface of the drum body 110.

As best seen in FIGS. 5–7, 12A and 12B, the label stripper assembly 130 is positioned immediately adjacent the drum body 110. The stripper assembly 130 includes a generally arcuate stripper blade 132 which is rectangular in transverse cross-section and is mounted on an L-shaped base bracket 134. The base bracket 134 is rotatably supported on a stud shaft 136 which extends through a horizontal portion 138 of the base bracket. An index pin 140 extends upwardly from the horizontal leg portion 138 of base bracket 134. A free end 142 of the stripper blade 132 is normally positioned in close proximity to the outer peripheral surface of the applicator drum body 110 and has a pair of spaced clearance slots 144 formed in its free end which accept passage of the extended pins 114 during rotation of the label applicator drum 100. As illustrated in FIGS. 6 and 12, the label-carrying substrate 60 has its tractor drive apertures engaged by the pins 114 after which the substrate passes about the free end 142 of the stripper blade 132 and undergoes a sharp or abrupt reversal in direction back upon a convex or outwardly arcuate surface 132*a* of the stripper blade. This action causes the substrate to automatically disengage itself from successive labels 62 at the point of direction reversal so that each label continues in a path about the periphery of the applicator drum 100 as it releases from the substrate. As an envelope 50 is fed into tangential relation to the applicator drum 100, the envelope depresses the spring loaded pins 114 which have released from the substrate so as to bring the surface of the envelope into intimate contact with the adhesive surface of an opposed released label 62. Such interment contact is assured by a pressure roller unit 160 which includes a first moveable spring urged roller 162 and second fixed spring urged or biased roller 164 which forms a nip with a driven ejection roller 166 for advancing the re addressed envelopes to the sorting and batching equipment 32 (not shown in FIG. 6).

Figure 9:
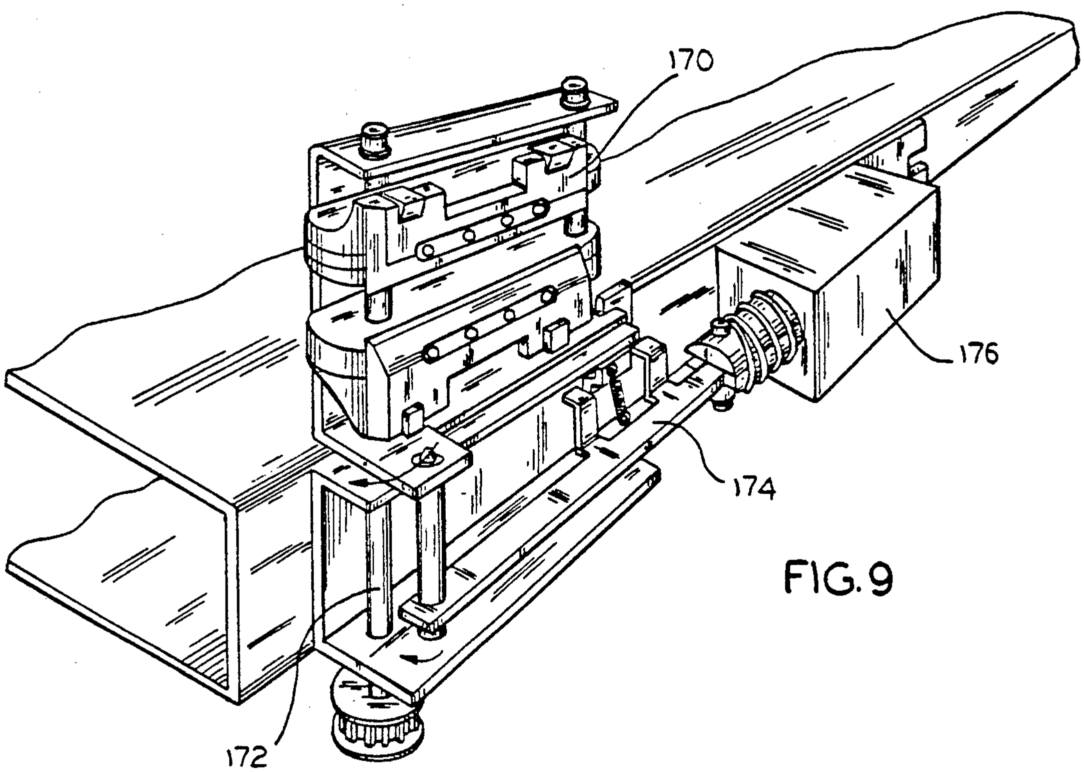
FIG. 9 is a partial perspective view of one of the tractor drive mechanisms shown in FIGS. 5-6.

When a rejection situation arises because of an error in input data, as by the operator depressing a wrong key on the computer keyboard or otherwise inputting erroneous data into the computer, the detector 76 detects the trailing end of the erroneous label 62 on the substrate 60, with a result as hereinafter explained. A tractor driven label rejector mechanism 168 is positioned immediately following or downstream from the label stripper assembly 130. The label rejection mechanism 168 includes a power tractor drive 170 which is similar to the power tractor drive 70. The tractor drive 170 is pivotable about a pivot shaft 172 when actuated by a solenoid 176 (FIG. 9) acting on an arm 174 in the direction of arrow 178. When a rejection situation arises, the detector 76 detects the trailing end of the particular erroneous label 62 on the substrate 60 and triggers the solenoid 176 at an appropriate time to pull arm 174 to the right (as shown by arrow 178 in FIG. 6) against the outward bias of a coil spring 179 to thereby move the tractor drive 170 about pivot axis 172 in a counterclockwise rotation to a position generally illustrated in phantom in FIG. 6. This deactivates the tractor drive 170 causing an immediate elimination of tension in the substrate 60 as it passes about the free end 142 of the stripper blade 132, thereby causing the substrate to separate from the convex surface 132*a* and form a loose loop 180 as illustrated in phantom in FIG. 6. Additionally, the detector 76 triggers the activation of a second solenoid (not shown) which is connected to an arm 163 interconnected to the backup roller 162 so as to cause the backup roller 162 to pivot in the direction of arrow 161 away from the backside of a corresponding envelope 50 when arm 163 is moved to the left as the second solenoid is activated. In this manner, pressure on the envelope from the backup roller 162 is removed, thereby causing the particular corresponding envelope otherwise plated for application of the erroneous label to stop until a corrected mailing label, which is created as the next successive label on the substrate, is positioned for application to the previously stopped envelope.

Figure 7:
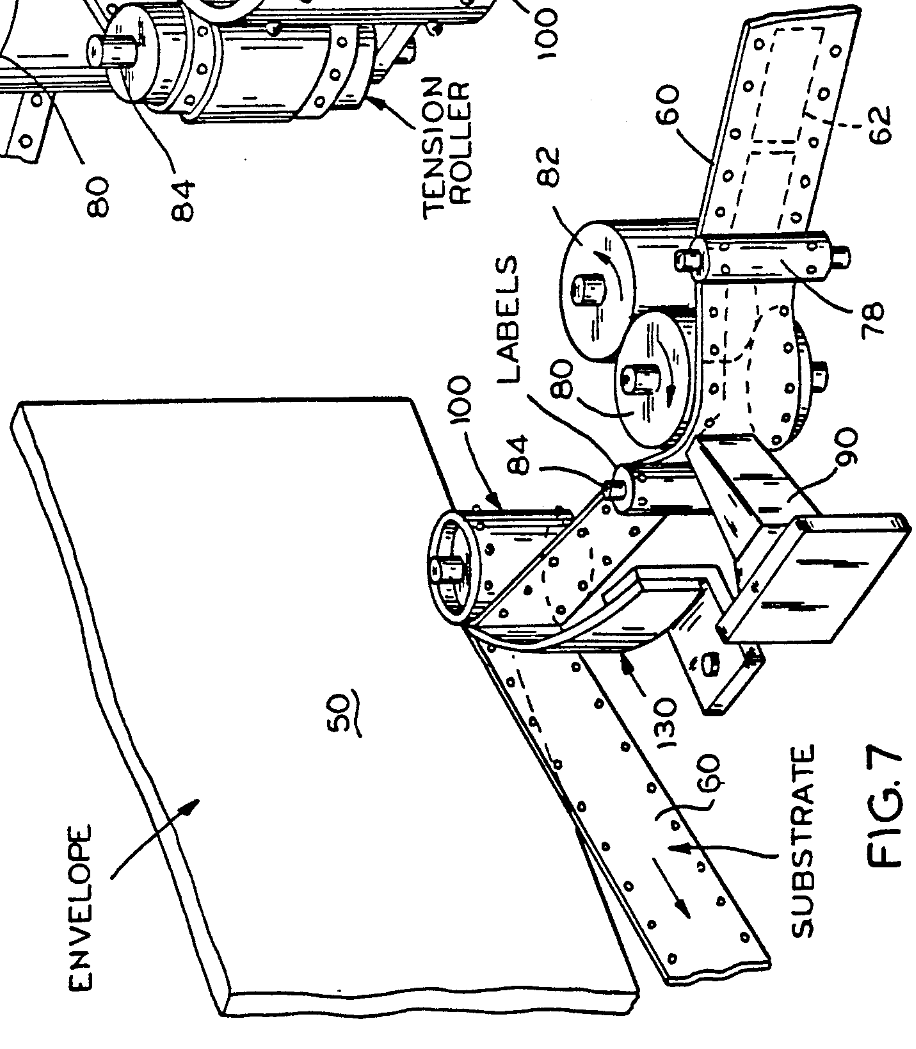
FIG. 7 is an enlarged partial perspective view of the path of movement of the substrate and labels during application.

In the embodiment illustrated in FIGS. 5–7, the label stripper assembly 130 is shown generally fixed in its tangential relationship to the applicator drum 100. The base bracket 134 which supports the arcuate stripper blade 132 is interconnected to the fixed stud shaft 136 by a spring 137. The spring 137 is coiled about the stud shaft 136 and has one end fixed to shaft 136 and an opposite end fixed to the horizontal plate portion 138 of base bracket 134. The spring 13 biases the stripper blade 132 to a position wherein its free end 142 is closely adjacent the applicator drum body 110. This configuration permits the stripper blade 132 to be rotated about stud 136 in a counter-clockwise direction, as viewed in FIG. 6. Movement of the stripper blade assembly 130 in a counterclockwise direction about its pivot axis 136 results in removal of the free end 142 of the stripper blade from close proximity to the label applicator drum 100 and facilitates feeding or loading of a new label substrate through the label applicator module, whereafter the stripper blade is returned to its normal operating position with its free end immediately adjacent the cylindrical periphery of the applicator drum 100.

As described, removal of tension in the substrate 60 by selective actuation of the tractor drive 170 prevents application of the next-to-be-applied printed label to the corresponding predetermined envelope. Any erroneous labels which are thus retained on the substrate are fed by the tractor drive unit 168 to a rotable scrap cutter 190 and backup roller 194 (FIG. 6) for disposition and deposit through a slot 192 into a waste container (not shown). In this manner, the substrate 60, either with or without attached erroneous mailing labels, is fed by the power tractor drive 170 to the cutter 190 with its backup roller 194 and into the scrap slot 192 and its waste container. The cut-up scrap is thereby made easier to handle and dispose of than a long continuous strip of scrap substrate.

After disposal of the rejected label to scrap, or at least passing the rejected label beyond the applicator drum 100, all of the power actuating means, such as solenoid 176 and the solenoid (not shown) connected to arm 163, are returned to normal or initial positions thereby returning the tractor drive 170 and roller 162 to positions again placing the substrate 60 in tension and preparing the system for further application of corrected mailing labels to envelopes.

It will be appreciated that movement of a label 62 in the same direction as an envelope 50 during application of the label to the envelope increases the efficiency of the machine and ensures a rapid and positive means for application of serially produced labels. The shortened time parameter between stripping the label from the substrate and applying it to the envelope also enhances the power of the adhesive utilized on the labels.

Other means for a applying labels to envelopes or packages will become apparent to those skilled in the art. Various features of the invention are defined in the following claims.

I claim:

1. A system for correcting mailing indicia on envelopes or the like, comprising, in combination, means for conveying mailing envelopes in sequential fashion along a predetermined path including a reading station enabling addressee indicia on the envelopes to be read by an operator, data processing means enabling the operator to input data relating to addressee indicia on a particular envelope disposed at said reading station, said data processing means being operative to provide output data relating to correction mailing indicia corresponding to the addressee indicia on said particular envelope, an elongated substrate carrying releasable labels in spaced aligned relation thereon, means for guiding said substrate and associated labels along a predetermined path, printing means for printing corrective indicia on successive labels carried on said substrate in response to said corrective mailing output data from said data processing means, label applying means cooperative with said substrate during movement along said path to selectively apply successive labels to predetermined envelopes as said envelopes and substrate are moved along their respective predetermined paths, and means responsive to an operator error signal for disabling said label applying means so as to retain a particular label on the substrate without application to its corresponding predetermined envelope.

2. A method for correcting mailing indicia on generally flat documents and the like, comprising the steps of:

a) conveying documents in sequential fashion along a predetermined path having a reading station enabling existing addressee indicia on the documents to be read by an operator, b) guiding an elongated substrate carrying releasable labels in spaced aligned relation thereon along a predetermined path, c) printing corrective indicia on successive labels carried on said substrate, d) causing said substrate and labels having corrective indicia thereon to undergo an abrupt change in direction while guided along said predetermined path under longitudinal tension so as to effect selective release of successive labels from said substrate and application of said labels to predetermined ones of said documents, and e) selectively reducing said longitudinal tension in said substrate so as to prevent release of selected ones of said labels from said substrate whereby to prevent application to a document.

3. The method as defined in claim 2 wherein said step of causing said substrate to undergo an abrupt change in direction includes passing said substrate around a free end of a stripper blade so that said substrate undergoes a substantial reversal in direction at said free end of said stripper blade.

4. The method of claim 3 wherein said step of reducing said longitudinal tension in said substrate comprises causing said substrate to form a loop downstream of said free end of said stripper blade so as to relieve longitudinal tension in said substrate.

5. The method as defined in claim 2 including the step of inputting data into data processing means relating to addressee indicia on a particular document disposed at said reading station, said data processing means being operative to provide output data relating to correction mailing indicia corresponding to the addressee indicia on said particular document, said step of printing corrective indicia on successive labels being responsive to correction mailing output data from said data processing means.

6. The method as defined in claim 4 including the step of passing said substrate through tractor drive means downstream from said stripper blade, said tractor drive means being operative in a first mode to create longitudinal tension in said substrate as it undergoes said abrupt change in direction, and being operative in a second mode to form said loop in said substrate downstream from said free end of said stripper blade.

* * * * *